United States Patent [19]

Okamoto

[11] Patent Number: 4,519,621
[45] Date of Patent: May 28, 1985

[54] CHUCK FOR A MACHINE TOOL

[75] Inventor: Norifumi Okamoto, Fukui, Japan

[73] Assignee: Okamoto Seiki Kogyo Kabushiki Kaisha, Fukui, Japan

[21] Appl. No.: 447,641

[22] Filed: Dec. 7, 1982

[30] Foreign Application Priority Data

Dec. 12, 1981 [JP] Japan .................... 56-200593

[51] Int. Cl.$^3$ ............................................ B23B 31/16
[52] U.S. Cl. ........................................ 279/116; 279/4
[58] Field of Search .................. 279/114, 116, 121, 4, 279/110, 1 DA, 1 DC

[56] References Cited

U.S. PATENT DOCUMENTS

| 2,597,280 | 5/1952 | Barnes | 279/121 |
| 2,767,993 | 10/1956 | Galler | 279/116 |
| 3,424,468 | 1/1969 | Steinberger et al. | 279/121 |
| 3,460,849 | 8/1969 | Highberg | 279/121 |
| 3,765,691 | 10/1973 | Saruhashi | 279/116 |
| 3,814,450 | 6/1974 | Bertorello | 279/116 X |
| 4,102,539 | 7/1978 | Röhm | 279/114 |

Primary Examiner—William R. Briggs
Assistant Examiner—Glenn L. Webb
Attorney, Agent, or Firm—LeBlanc, Nolan, Shur & Nies

[57] ABSTRACT

A chuck for a machine tool is disclosed which comprises a cylindrical scroll board with a scroll groove being formed on one end surface thereof and having three radial slots formed therethrough at equi-angular intervals, three slider blocks radially movably received within the radial slots and each provided on the under surface with a number of arcuate grooves so as to be in communication with the scroll groove and on the radially inner end with an engaging element, a cup-shaped cover board adapted to rotatively receive therein the scroll board and provided on the annular cover plate constituting the bottom thereof with three radial slots at equi-angular intervals, three claws radially movably received within the radial slots of the cover plate and each provided on the under surface with a number of arcuate projections so as to be in mesh with the scroll groove, and a manipulating member axially movably received within a bore formed in the scroll board centrally thereof and adapted to be moved by an actuating means, the manipulating member being formed with three engaging means adapted to cooperate with the engaging elements so as to move the slider blocks radially when it is actuated.

8 Claims, 5 Drawing Figures

CHUCK FOR A MACHINE TOOL

BACKGROUND OF THE INVENTION

The present invention relates to chucks for a machine tool and more particularly to scroll chucks for a machine tool.

As well-known in the art scroll chucks for a machine tool, e.g. lathe, have such defects that the force of the claws constituting the chuck to clamp a workpiece is weak and the constitutional components to actuate the claws are easily subject to wear, making the cntering of the workpiece difficult.

As a countermeasure, to compensate for the defects of the scroll chucks, hydroulic chucks have also been well-known in the art. However, they reveal another defect that since each time the diameter of a workpiece changes, the claws have to be shifted by loosening the bolts fastening them to the main body in order to adapt them to the changed diamter, taking a long time to rechuck the workpiece, etc.

SUMMARY OF THE INVENTION

It is an object of the present invention to provide a chuck for a machine tool which can eliminate all defects inherent to conventional scroll and hydraulic chucks as described above.

It is another object of the present invention to provide a chuck for a machine tool which can encompass the advantages of both the conventional scroll chucks as well as hydraulic chucks.

It is a further object of the present invention to provide a chuck for a machine tool which allows a rapid and sure clamping of workpiece when their diameters change.

In accordance with the present invention a chuck for a machine tool is provided which comprises a scroll board having generally a cylindrical main body with a scroll groove being formed on one end surface and having a number of radial slots formed therethrough, a correponding number of slider blocks each radially movably received within each of the radial slots and having a number of arcuate grooves on the exposed surface so as to be in communication with the scroll groove, the slider block being further provided on the radially inner end with an engaging element, a cup-shaped cover board adapted to rotatively receive therein the scroll board, the cover plate forming the closed end of cover board being formed with a corresponding number of radial slots, a corresponding number of claws radially movably received within the radial slots of the cover plate and each provided on the under surface with a number of arcuate projections so as to be in mesh with the scroll groove, and a mainpulating member axially movably received within a bore formed in the scroll board centrally thereof and adapted to be moved by a suitable actuating means, the mainpulating member being formed on its outer periphery with a corresponding number of engaging means adapted to cooperate with the engaging elements of the slider blocks so as to move them radially when the manipulating member is moved axially.

BRIEF DESCRIPTION OF THE DRAWINGS

These and other objects of the present invention will become more readily apparent upon reading the following specification and upon referring to the accompanying drawings, in which.

DESCRIPTION OF THE PREFERRED EMBODIMENT

Figure 1:
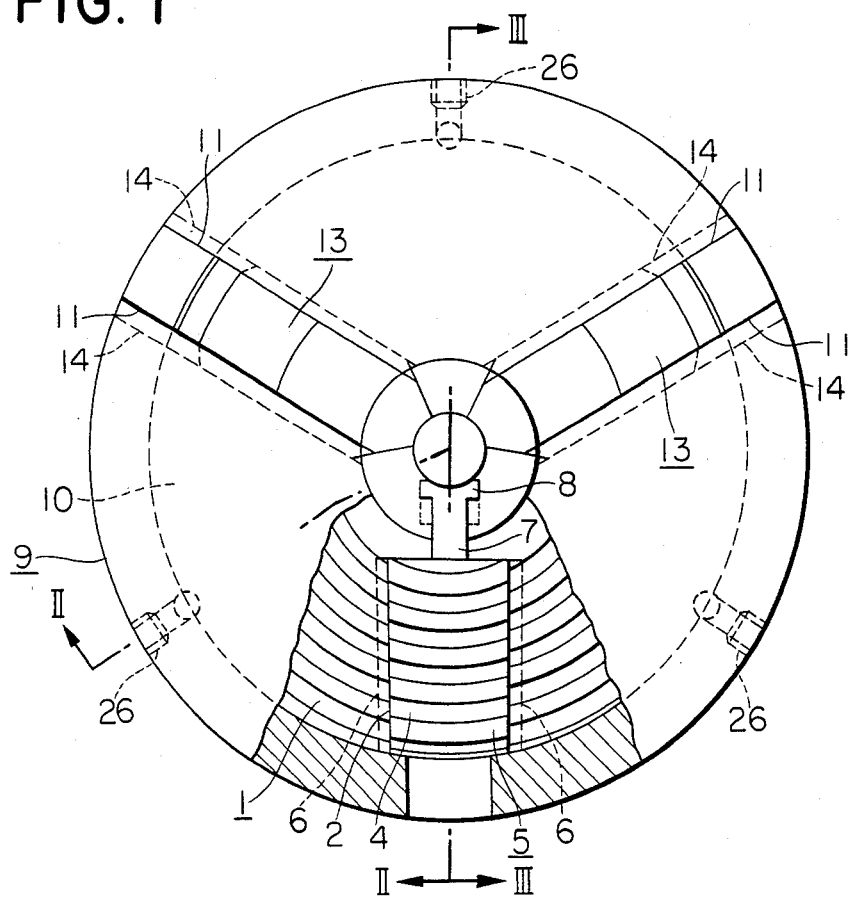
FIG. 1 is a front elevational view of a chuck embodying the present invention, the cover plate being partly broken away.
Figure 2:
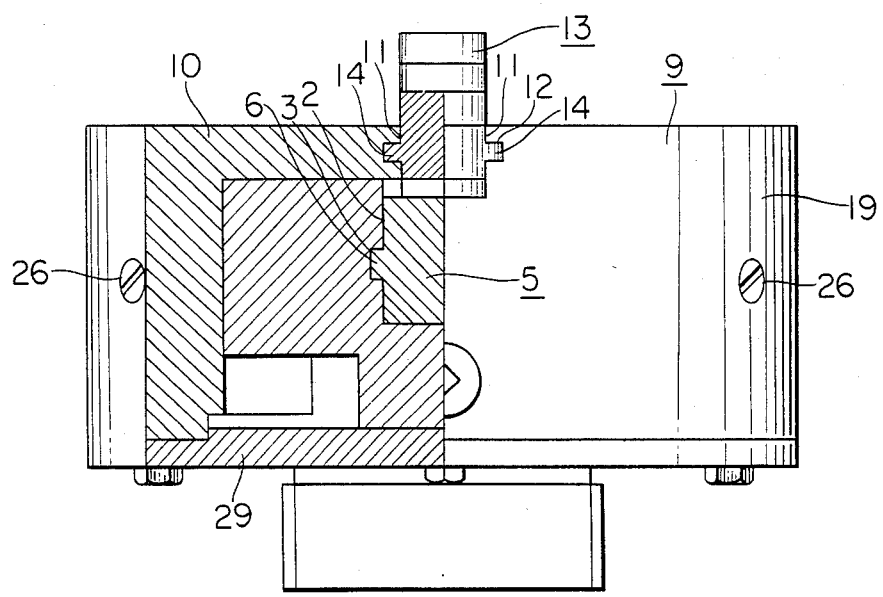
FIG. 2 is a sectional view of the chuck shown in FIG. 1 taken along the line II—II thereof.
Figure 3:
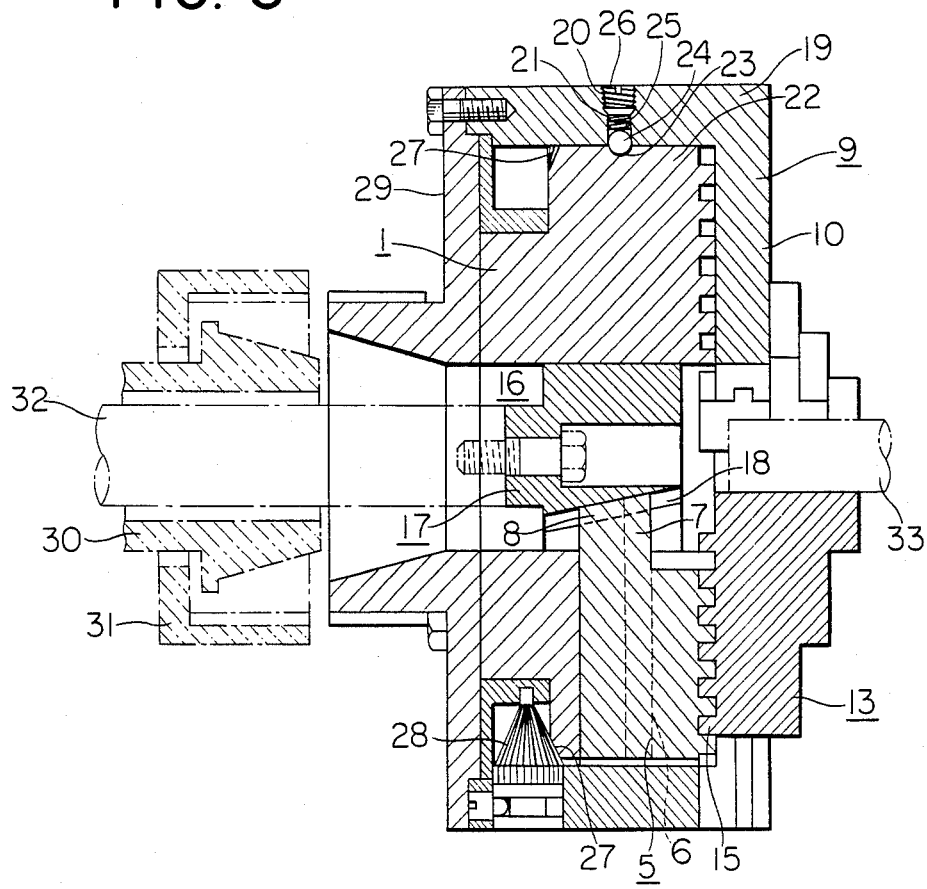
FIG. 3 is a sectional view of the chuck shown in FIGS. 1 and 2 taken along the line III—III of FIG. 1.

Referring now to FIGS. 1 to 3 of the attached drawings, an annular scroll board 1 having a scroll groove on its one surface is formed through its cylindrical main body 22 with three radial slots 2 at equi-angular intervals so as to open in the grooved surface, and each of slots 2 has a rectangular shape in plan view and their confronting side walls are formed at substantially a mid portion of their depth with guide grooves 3, respectively, so as to elongate in parallel with the grooved surface and at the same time in parallel with each other, guide groove 3 being rectangular in cross section. A slider block 5 having a rectangular shape in plan view and a cross section substantially corresponding to that of guide groove 3 is introduced into each of slots 2 so as to be shiftable radially. For this purpose, slider block 5 is formed on its opposite side walls with ridges 6, respectively, each having a cross section corresponding to that of guide groove 3. Further, slider block 5 has a number of arcuate grooves 4 formed on its upper surface in communication with the scroll groove of scroll board 1. Integrally provided on the radially inner end surface of slider block 5 is a stepped projection 7 having generally a T-shape in plan view, a wing piece 8 formed at the radially innermost end of projection 7, as constituted by the transverse bar of the T-shape, elongating at right angles to the radial direction and being tapered at an angle relative to the surface provided with arcuate grooves 4 so that the surface of wing piece 8 adjoining arcuate grooves 4 protrudes further than the surface remote therefrom.

A cup-shaped cover board 9 comprising a cylindrical body 19 and an annular cover plate 10 closing one of its ends, is adapted to rotatively contain therein scroll board 1 and is formed in annular cover plate 10 confronting the scroll groove of scroll board 1 with three radial slots 11 at equi-angular intervals, slot 11 having a rectangular form in plan view and provided with confronting guide grooves 12 on opposite walls, respectively, at substantially a mid portion of the thickness, guide groove 12 being rectangular in cross section. A claw 13 having a rectangular shape in plan view is radially shiftably received within slots 11, respectively, such that ridges 14 formed on the opposite side walls, respectively, are slidably fit in guide grooves 12, respectively, formed on the side walls of claw 13, whereby the cross section of ridge 14 corresponds to that of guide groove 12. Claw 13 is provided on its under surface with a number of arcuate projections 15 so as to be in mesh with the scroll groove formed on the upper surface of scroll board 1.

Figure 5:
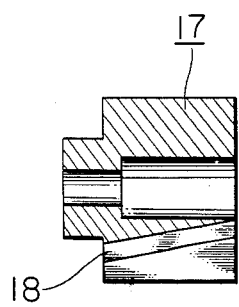
FIG. 5 is a sectional view of the manipulating member shown in FIGS. 1 and 4 taken along the line V—V of FIG. 4.
Figure 4:
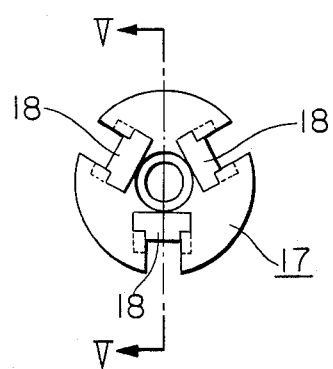
FIG. 4 is a front elevational view of the manipulating member shown in FIG. 1.

Central bore 16 is formed centrally to main cylindrical body 22 of scroll board 1 and annular cover plate 10 of cover board 9. Slidably introduced into bore 16 of scroll board 1 is a cylindrical manipulating member 17 which is adapted to be connected to the piston rod 32 of a fluid cylinder (not shown), the outer periphery of which is axially formed with three T-shaped slots 18, slot 18, as shown in FIGS. 4 and 5, having a cross section substantially complementing that of the outer end portion of T-shaped projection 7 provided at the radially inner end of slider block 5 and the bottom of slot 18 tapers from the free end towards piston rod 32 so as to be expanded.

Cover board 9 is formed in cylindrical body 19 with screw thread holes 20 from the outside at equi-angular intervals and at substantially a mid portion of the height, each screw thread hole 20 being provided with a countersink 21 at the inner wall side of cylindrical body 19, cylindrical main body 22 of scroll board 1 being provided with semi-spherical concave portions 23, respectively, at the positions corresponding to countersinks 21 of cylindrical body 19 of cover board 9. Disposed within concave portions 23 and countersinks 21 are ball 24 and a coil spring 25, respectively, whereby ball 24 is forced to lodge in concave portion 23 through coil spring 25 by compressing it when a setscrew 26 is screwed to screw thread hole 20 formed in cylindrical body 19 of cover board 9.

In the drawings the reference numeral 27 is teeth formed around the lower outer edge of cylindrical main body 22 of scroll board 1, 28 is a driving gear rotatively mounted in cylindrical body 19 of cover board 9 which is provided on its radially elongated conical outer periphery with teeth in mesh with teeth 27 and adapted to rotate scroll board 1, 29 is a bottom plate to close the other open end of cylindrical body 19 of cover board 9, 30 is a main spindle of a lathe as a machine tool, 31 is a socket member adapted to secure main spindle 30 to bottom plate 29, and 33 is a workpiece to be clamped by claws 13.

Next the operation of the chuck according to the present invention which has the constitution as described above will be explained below.

When balls 24 pressing cylindrical main body 22 of scroll board 1 at concave portions 23 are released by unscrewing setscrews 26 and driving gear 28 is rotated by a suitable tool in a manner well-known in the art, scroll board 1 is rotated relative to cover board 9 by means of teeth 27 in mesh with the teeth of driving gear 28, whereby since arcuate projections 15 formed on the lower surface of claws 13 are in mesh with the scroll groove formed on the upper surface of scroll board 1 claws 13 are forced to shift radially inwardly or outwardly within slots 11 formed in cover plate 10 of cover board 19 under the engagement of guide grooves 11 and ridges 14 formed in and on slots 11 and claws 13, respectively, depending on whether driving gear 28 is rotated clockwise or anti-clockwise, thereby workpiece 33 is suitably camped by claws 13.

The above description is the explanation of the operation of the chuck when it is used as a scroll chuck.

In this case, when the manipulation of driving gear 28 is stopped at the state where claws 13 nearly clamp work 33 and balls 24 contained in cylindrical body 19 of cover board 9 come to the position where they confront semi-spherical concave portions 23 formed in the outer periphery of cylindrical main body 22 of scroll board 1, setscrews 26 are screwed to compress coil springs 25 so as to urge balls 24 towards concave portions 23, thereby scroll board 1 is secured to cover board 10. After this condition is attained, when manipulating member 17 is pulled leftwards as viewed in FIG. 3 by the actuation of the fluid cylinder to cause piston rod 32 to be moved in that direction claws 13 are moved radially inward by the fact that slider blocks 5 are in engagement with claws 13, respectively, through arcuate grooves 4 and arcuate ridges 15, respectively, formed on the upper surface of slider blocks 5 and under surface of claws 13, respectively, and that manipulating member 17 and slider blocks 5 are in engagement with each other with tapered T-shaped slots 18 of the former being in mesh with tapered T-shaped wing pieces 8 of the latter. Thus, workpiece 33 is quite firmly clamped by claws 13.

This clamping procedure of claws 13 represents the chuck being used according to the present invention as a hydraulic chuck.

From the foregoing it will be appreciated that when the chuck in accordance with the present invention is used as a hydraulic chuck, since claws 13 are actuated first in a manner of a scroll chuck by rotating scroll board through the rotation of driving gear 28 until workpiece 33 is nearly clamped by claws 13 and subsequently claws 13 are moved hydraulically by means of slider blocks 5 to clamp workpiece 33 firmly, workpiece 33 having different diameters can be clamped by claws 13 within a quite short time with the application of quite strong force hydraulically, increasing the productivity of the machine tool, e.g. a lathe.

Although a single preferred embodiment of the present invention has been described and illustrated, modifications may be made in the structure, form and relative arrangement of parts without necessarily departing from the spirit and the scope of the present invention.

What is claimed is:

1. A chuck for a machine tool comprising a scroll board of generally a cylindrical main body having a concentric bore therein with a scroll groove being formed on one end surface thereof and having a number of radial slots formed through said cylindrical main body so as to open in said end surface, a corresponding number of slider blocks each radially movably received within each of said radial slots and having a number of arcuate grooves on the exposed surface so as to be in communication with said scroll groove of said scroll board, each said slider block being provided on the radially inner end with a radial elongation which is formed on the radial inner end with an engaging element, a cup-shaped cover board having a cylindrical body and an annular cover plate closing one of open ends thereof so as to rotatively receive said scroll board within the space defined by said cylindrical body and said cover plate, whereby said annular cover plate confronts said scroll groove of said scroll board, said annular cover plate being formed with a corresponding number of radial slots therethrough, a corresponding number of claws each radially movably received within said slots, respectively, of said annular cover plate of said cover board and provided on the under surface with a number of arcuate projections so as to be in mesh with said scroll groove of scroll board, and a manipulating member having generally a cylindrical form and axially movably received within said bore of said scroll board and adapted to be moved by a suitable actuating means, said manipulating member being formed on its outer periphery with a corresponding number of engaging means each adapted to cooperate with said each of engaging elements of said slider blocks so as to move them radially when said manipulating member is moved axially.

2. A chuck for a machine tool as claimed in claim 1 wherein said radial slots formed in said cylindrical main body of said scroll board and said annular cover plate of said cover board are respectively three in number and disposed at equi-angular intervals.

3. A chuck for a machine tool as claimed in claim 2 wherein said slider block and said radial slot of said scroll board are movably engaged with each other by means of guide grooves and ridges formed therein, respectively.

4. A chuck for a machine tool as claimed in claim 2 wherein said claw and said slot of said cover board are movably engaged with each other by means of guide grooves and ridges formed therein, respectively.

5. A chuck for a machine tool as claimed in claim 1 wherein said elongation of each said slider block has generally a T-shape in plan view with said engaging element being constituted by the transverse bar thereof, whereby the radially inner end surface of said elongation is tapered such that its upper surface projects more radially inwards than the lower surface, and said engaging means of said manipulating member has the form of a groove the cross section of which is complementary to said T-shape of said elongation.

6. A chuck for a machine tool as claimed in claim 1 wherein said manipulating member is adapted to be connected to the piston rod of a fluid cylinder as said actuating means, said piston rod passing through a hollow main spindle of said machine tool.

7. A chuck for a machine tool as claimed in claim 1 including means enabling said scroll board and said cover board to be locked at the position where said slots of said scroll board and said cover board confront each other.

8. A chuck for a machine tool as claimed in claim 7, wherein said means enabling locking of said scroll board and said cover board include a number of balls each radially movably received within radial holes formed in said cylindrical body of said cover board, and associated semi-spherical concave portions formed in the outer periphery of said cylindrical main body of said scroll board, and biasing means associated with each ball respectively urge the balls into detent locking cooperation with said concave portions when said scroll board and said cover board are at the desired position where said slots confront each other.

* * * * *